United States Patent
Kharbanda et al.

(10) Patent No.: US 12,525,231 B2
(45) Date of Patent: *Jan. 13, 2026

(54) SYSTEMS AND METHODS FOR ANALYZING TEXT EXTRACTED FROM IMAGES AND PERFORMING APPROPRIATE TRANSFORMATIONS ON THE EXTRACTED TEXT

(71) Applicant: Google LLC, Mountain View, CA (US)

(72) Inventors: Harshit Kharbanda, Pleasanton, CA (US); Jessica Lee, Brooklyn, NY (US); Christopher James Kelley, Orinda, CA (US); Fabian Roth, Zürich (CH); Dounia Berrada, Saratoga, CA (US); Samer Hassan Hassan, Saratoga, CA (US); Afroz Mohiuddin, Campbell, CA (US); Mikhail Khalman, San Francisco, CA (US); Ali Essam Ali Elqursh, San Jose, CA (US); Belinda Luna Zeng, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/736,113

(22) Filed: Jun. 6, 2024

(65) Prior Publication Data
US 2025/0087207 A1    Mar. 13, 2025

Related U.S. Application Data

(63) Continuation of application No. 18/463,951, filed on Sep. 8, 2023, now Pat. No. 12,033,620.

(51) Int. Cl.
G06F 16/50    (2019.01)
G06F 16/538    (2019.01)
(Continued)

(52) U.S. Cl.
CPC ........ *G10L 15/183* (2013.01); *G06F 16/5846* (2019.01); *G06V 10/778* (2022.01);
(Continued)

(58) Field of Classification Search
USPC ............ 382/128–190; 704/1–275; 706/1–62, 706/900–903; 707/708–740
See application file for complete search history.

(56) References Cited

U.S. PATENT DOCUMENTS 7,861,161 B1    12/2010    Bedell et al.
8,595,220 B2 *    11/2013    Drucker ............... G06F 16/285
                                                                   707/723
(Continued)

OTHER PUBLICATIONS

Hwang Young-sook; Method and Apparatus for Text Summary in Display Ad; 2021 (Year: 2021).*

(Continued)

*Primary Examiner* — Marcellus J Augustin
(74) *Attorney, Agent, or Firm* — DORITY & MANNING P.A.

(57)    ABSTRACT

The present disclosure provides computer-implemented methods, systems, and devices for responding to requests associated with an image. A computing system obtains, wherein the image depicts a first set of textual content. The computing system determines one or more characteristics of the first set of textual content. The computing system determines a response type from a plurality of response types based on the one or more characteristics. The computing system generates a model input, wherein the model input comprises data descriptive of the first set of textual content and a prompt associated with the response type. The computing system provides providing the model input as an input to a machine-learned language model. The computing system receives a second set of text as an output of the machine-learned language model as a result of the machine- (Continued)

learned language model processing the model input. The computing system provides the second set of text for display to a user, wherein the second set of textual content is associated with the response type.

20 Claims, 11 Drawing Sheets

(51) Int. Cl.
    *G06F 16/583*     (2019.01)
    *G06F 18/213*     (2023.01)
    *G06F 40/10*     (2020.01)
    *G06F 40/117*     (2020.01)
    *G06N 5/045*     (2023.01)
    *G06V 10/778*     (2022.01)
    *G06V 30/14*     (2022.01)
    *G06V 30/148*     (2022.01)
    *G10L 15/183*     (2013.01)
    *G10L 15/22*     (2006.01)
    *G10L 15/30*     (2013.01)
(52) U.S. Cl.
    CPC ........ *G06V 30/1456* (2022.01); *G06V 30/153* (2022.01); *G10L 15/22* (2013.01); *G10L 15/30* (2013.01)

(56) References Cited

U.S. PATENT DOCUMENTS

| | | |
|---|---|---|
| 10,459,900 B2 | 10/2019 | Chen et al. |
| 10,878,488 B2 * | 12/2020 | Lee ................. G06F 40/169 |
| 12,033,620 B1 * | 7/2024 | Kharbanda ............ G10L 15/30 |
| 2007/0133874 A1 | 6/2007 | Bressan et al. |
| 2018/0150905 A1 | 5/2018 | Lee et al. |
| 2020/0074014 A1 | 3/2020 | Bakir et al. |
| 2021/0303939 A1 * | 9/2021 | Hu ................. G06V 10/25 |
| 2022/0067284 A1 | 3/2022 | He et al. |
| 2023/0222285 A1 | 7/2023 | Zhang et al. |
| 2023/0259544 A1 | 8/2023 | Gharebagh et al. |

OTHER PUBLICATIONS

Modani, N; Multimedia Document; 2017 (Year: 2017).*
International Search Report and Written Opinion for PCT/US2024/045563, mailed on Nov. 6, 2024, 10 pages.
Williams, "How to Convert Images to Text using Google Lens OCR", Feb. 2, 2023, URL:http://web.archive.org/web/20230202190603/https://pdf.wondershare.com/ocr/google-lens-ocr.html, retrieved on Nov. 1, 2024, 10 pages.

* cited by examiner

SYSTEMS AND METHODS FOR ANALYZING TEXT EXTRACTED FROM IMAGES AND PERFORMING APPROPRIATE TRANSFORMATIONS ON THE EXTRACTED TEXT

PRIORITY CLAIM

The present application is a continuation of U.S. application Ser. No. 18/463,951 having a filing date of Sep. 8, 2023. Applicant claims priority to and the benefit of each of such applications and incorporate all such applications herein by reference in its entirety.

FIELD

The present disclosure relates generally to performing appropriate transformations on text. More particularly, the present disclosure relates to identifying text in an image, extracting it, and performing one of a plurality of transformations on the text based on the characteristics of the text.

BACKGROUND

As computing devices have improved, they can be used to provide an increasing number of services to users. In some examples, computing devices can be used to capture and display images. These images may include components that are of interest to the user. The computing system may be enabled to perform a plurality of different services or transformations associated with the interesting components. It would be useful if a computing system (or an application thereon) could perform an appropriate service based on one or more characteristics of the interesting component.

SUMMARY

Aspects and advantages of embodiments of the present disclosure will be set forth in part in the following description, or can be learned from the description, or can be learned through practice of the embodiments.

One example aspect of the present disclosure is directed at a computing system. The system can include one or more processors and one or more non-transitory computer-readable media that collectively store instructions that, when executed by the one or more processors, cause the computing system to perform operations. The operations can include obtaining an image, wherein the image depicts a first set of textual content. The operations further comprise determining one or more characteristics of the first set of textual content. The operations further comprise determining a response type from a plurality of response types based on the one or more characteristics. The operations further comprise generating a model input, wherein the model input comprises data descriptive of the first set of textual content and a prompt associated with the response type. The operations further comprise providing the model input as an input to a machine-learned language model. The operations further comprise receiving a second set of text as an output of the machine-learned language model as a result of the machine-learned language model processing the model input. The operations further comprise providing the second set of text for display to a user, wherein the second set of textual content is associated with the response type.

Another example aspect of the present disclosure is directed to computer-implemented method. The method comprises obtaining, by a computing system with one or more processors, an image, wherein the image depicts a first set of textual content. The method further comprises determining, by the computing system, one or more characteristics of the first set of textual content. The method further comprises determining, by the computing system, a response type from a plurality of response types based on the one or more characteristics. The method further comprises generating, by the computing system, a model input, wherein the model input comprises data descriptive of the first set of textual content and a prompt associated with the response type. The method further comprises providing, by the computing system, the model input as an input to a machine-learned language model. The method further comprises receiving, by the computing system, a second set of text as an output of the machine-learned language model as a result of the machine-learned language model processing the model input. The method further comprises providing, by the computing system, the second set of text for display to a user, wherein the second set of textual content is associated with the response type.

Another example aspect of the present disclosure is directed to one or more non-transitory computer-readable media that collectively store instructions that, when executed by one or more computing devices, cause the one or more computing devices to perform operations. The operations can include obtaining an image, wherein the image depicts a first set of textual content. The operations further comprise determining one or more characteristics of the first set of textual content. The operations further comprise determining a response type from a plurality of response types based on the one or more characteristics. The operations further comprise generating a model input, wherein the model input comprises data descriptive of the first set of textual content and a prompt associated with the response type. The operations further comprise providing the model input as an input to a machine-learned language model. The operations further comprise receiving a second set of text as an output of the machine-learned language model as a result of the machine-learned language model processing the model input. The operations further comprise providing the second set of text for display to a user, wherein the second set of textual content is associated with the response type.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
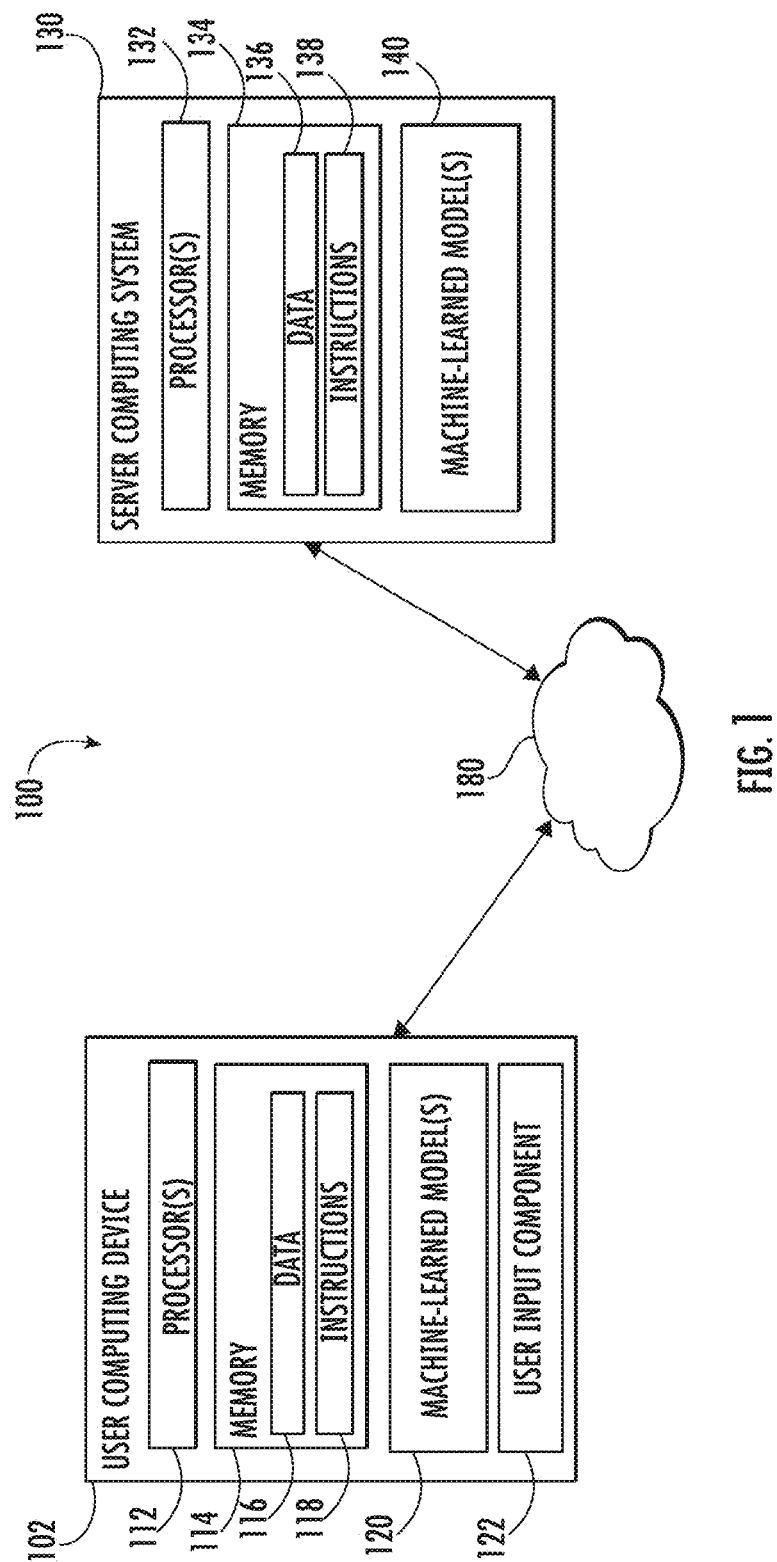
FIG. 1 depicts a block diagram of an example computing system that uses machine-learned models to respond to user requests with respect to text extracted from an image according to example embodiments of the present disclosure.

Reference numerals that are repeated across plural figures are intended to identify the same features in various implementations.

DETAILED DESCRIPTION

Generally, the present disclosure is directed to systems and methods for analyzing textual content in images and providing appropriate actions or services in response to a user request. In particular, the systems and methods disclosed herein can leverage image processing techniques (e.g., optical character recognition or similar techniques) and machine-learned models to provide analysis and additional content for text included in an image. For example, the systems and methods disclosed herein can be utilized to obtain image data, process the image data to extract textual content (e.g., words or tokens that are in the image), determine one or more characteristics of the textual content (or the image), and, responsive to a user request, use a large language model to provide a service to the user based on the one or more characteristics of the text (or image). The services can include one or more of: a summary, an answer to a query associated with the textual content or image, or an explanation of the text.

In some examples, an image processing system can obtain an image. In some examples, the images can be a portion of a live video captured by a camera associated with the user computing device and represent a live representation of the area of the user computing device. In other examples, the images can be stored image files accessed by the user computing device. The images can be displayed on a screen of a user computing device. The image processing system can determine that the image contains text and extract it using one or more text recognition techniques.

The image processing system can determine one or more characteristics associated with the text, the image, and/or input received from the user. Based on these characteristics, the image processing system can determine a response type associated with the image and any extracted textual content.

For example, the image processing system can determine that the appropriate response type is a summary response, a query answer response, or an explanation response. In some implementations, the image processing system can update the interface displaying the image to include an interactive element that allows the user to request a response of the determined type (or to request a different response). Thus, the image processing system can infer the correct type of response to be performed on the text. The inferred type of response can be displayed by selection by the user or can automatically be performed.

The image processing system can generate model input based on the text, the image, and/or the inferred response type (e.g., requested by the user). The model input can be transmitted to a machine-learned model (e.g., a large language model). The machine-learned model can output a response to the request. In some examples, the request can be for a summarization of the textual content included in the image. If so, the output of the machine-learned model can be a summary of the text. In this case, the output will have less volume of text than the text extracted from the image. In other cases, if a different response type is requested (such as an explanation type or a query answer type), the content output by the machine-learned model may in some instances be larger than the textual content that is input into the machine-learned model.

The output of the model can be displayed to the user in the user interface of the user computing device. In some examples, the output can be displayed proximate to or overlapping the image in which the text was originally found.

More specifically, a user computing device can be any type of computing device, such as, for example, a personal computing device (e.g., laptop or desktop), a mobile computing device (e.g., smartphone or tablet), a gaming console or controller, a wearable computing device, an embedded computing device, or any other type of computing device. In some examples, the user computing device can include an image capture sensor such as a camera.

In some implementations, the user computing device can, using an integrated camera, obtain image data of their environment or a specific object in their environment). In some implementations, the captured or obtained image data can have text included in the image. In other examples, images can be accessed via communication networks. A user may wish to interact with or receive a service associated with the image.

For example, if the image includes a large amount of dense text, the user may have questions about the content included therein, the meaning of it, or wish to have some or all of the dense volume of text summarized or explained to them. The user computing device can include an image analysis system that can extract the text from the image into the first set of textual content. The first set of textual content can be generated using the OCR technique. However other techniques can also be used to extract textual content from an image.

Once the textual content has been extracted, the image analysis system can determine one or more characteristics of the image, the first set of textual content, or other input by the user to determine an appropriate response type. For example, the image analysis system can determine a density associated with the text. The density can be measured by the number of words and the amount of space those words take up on the screen. Thus, if the image includes a large number of words in a small area of the screen, the density of the first set of textual content can be determined to be relatively high. Another characteristic may be based on the content of the first set of textual content.

For example, if the image analysis system determines that the content of an image is associated with a difficult topic or with learning (or teaching), the image analysis system can determine that an explanation of the text may be appropriate. The user interface can be updated to add user interface elements associated with the determined appropriate response. For example, the user interface can be updated to include a "summarize" button, if the system determines that a summary is appropriate.

In some examples, one of the characteristics can be text input into a query field provided by the image display application. The query field can allow the user to input a query associated with either the image, the textual content extracted from the image, or both. In some examples, the user can enter a query via voice communication. The image analysis system can determine whether the query is associated with the content of the image. If so, the image analysis system can determine that the appropriate response is a query response type and can update the user interface to include a query interface element.

Once the user interface has been updated to include an appropriate response element (e.g., a summary button, an explanation button, or a query response button), the user can select the response element. The user can select the response element (e.g., summary button), and in response, the image analysis system can generate a response request. The response request can be based on the element that the user has selected. For example, if the user selects a summarize button, the image analysis system can generate a summary request. The summary request can include the first set of textual information, information about the image or the image content, as well as instructions indicating that the request is a summary request. This information can be included as input to a model. This model input can be sent to a machine-learned model as input.

In some examples, the machine-learned model is implemented by a remote server system and the input is transmitted via a communication network to the remote server system. In other examples, the machine-learned model is stored at the computing device and the model can just be transmitted to the model within the device. The model input can be a prompt to a large language model. The prompt can include the first set of textual data, an indication of the response type, information about the image content, and any associated contextual information. Contextual information can include information about the user (if the user agrees to supply such information), information describing previous requests and the corresponding responses, and so on.

The machine-learned model can receive the model input. The machine-learned model can process the model input and generate an output. The specific output can be based on the first set of textual information and the response type. For example, if the response type was a summary, the output can be a summary of the first set of textual information. In this case the output can contain less text than the first set of textual data. In another example, the request type can be an explanation request. If so, the output can be text that explains the first set of textual content. If the response type is a response type, the output can be a response to a query from the user about the content of an image.

The output can be displayed to the user via the user interface. In some examples, the output of the machine-learned model is displayed in the user interface near or overlayed on the image. For example, a summary of text in an image can be displayed in the user interface near the text that it summarizes.

The systems and methods of the present disclosure provide a number of technical effects and benefits. As one example, the system and methods can provide real-time responses to live video or images. In particular, the systems and methods disclosed herein can obtain image data, process the image data, determine an appropriate response type, and, using a machine-learned model, generate an appropriate response for display to a user. A technical benefit of the systems and methods of the present disclosure is the ability to leverage information generated by an image processing system to determine one or more characteristics of one or more images and the text included in the image(s) to determine an appropriate response for the user. Doing so results in improved computational efficiency and improvements in the functioning of a computing system.

For example, the systems and methods disclosed herein can automatically select a type of response to offer to a user (via an element inserted into an updated interface). Doing so reduces the need for a user to select a specific response type (in many cases), resulting in an easier to use application. Additionally, correctly estimating the appropriate response type can result in more efficient use of processor time and battery power. In addition, this determination can be performed locally as a user computing device. Processing locally on a user computing device can limit the data that is transmitted over a network to a server computing system for processing, which can be more efficient or effective for computing systems with limited network access.

Thus, the proposed system solves the technical problem of how to effectively analyze and extract valuable information from textual content in images, and subsequently provide relevant and appropriate services or actions in response to user requests. In particular, the system uses image processing techniques and machine-learned models to analyze textual content in images. These techniques are technical in nature, as they involve specific algorithms, computations, and operations on the data. The proposed system provides a technical effect by extracting textual content from an image, determining one or more characteristics of the textual content, and using a large language model to provide a service based on these characteristics. These operations involve processing and transforming data in a way that achieves a concrete and tangible result. For example, the system may provide a summary, an answer to a query, or an explanation of the text, which are meaningful outputs that serve a practical purpose. Moreover, the system's ability to obtain image data from both live video feeds and stored image files, and to update the interface to include an interactive element for user requests, further demonstrate its technical nature. These features involve specific hardware configurations and software instructions that are necessary to implement the system.

With reference now to the Figures, example embodiments of the present disclosure will be discussed in further detail.

FIG. 1 depicts a block diagram of an example computing system 100 that uses machine-learned models to respond to user requests with respect to text extracted from an image according to example embodiments of the present disclosure. The system 100 includes a user computing device 102, and a server computing system 130 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120 for responding to user's requests associated with textual content extracted from an image. In some implementations, the user computing device 102 can store or include one or more machine-learned models 120. In some implementations, the user computing device 102 can store or include one or more machine-learned models 120. For example, the machine-learned models 120 can be or can otherwise include various machine-learned models such as neural networks (e.g., deep neural networks), large language models (LLMs) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 are discussed with reference to FIGS. 6 and 7.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel optimization of user interactions and task selection for large language models across multiple instances of the models 120).

More particularly, machine-learned model(s) 120 can, in some implementations, include a machine-learned large language model. The machine-learned large language model can be, or otherwise include a model that has been trained on a large corpus of language training data in a manner that provides the machine-learned large language model with the capability to perform multiple language tasks. For example, the machine-learned large language model can be trained to perform summarization tasks, conversational tasks, simplification tasks, oppositional viewpoint tasks, explanation tasks, tasks requiring the model to respond to a query, etc. In particular, the machine-learned large language model can be trained to process a variety of outputs to generate a language output. For example, the machine-learned large language model can process a model input that can include a first set of textual content extracted from an image, a query, a summarization request, an explanation request, and image data. In some examples, the image data can be provided as context for the main request (e.g., summarization, explanation, or responding to a user entered query).

More particularly, in some embodiments, the machine-learned model 120 may process a first set of textual content, a request, and, in some instances, image content as input to determine an appropriate response including a second set of textual content. For example, the machine-learned model 120 may be trained to summarize, explain, or respond to a query associated with the first set of textual content.

Additionally, or alternatively, in some embodiments the machine-learned model(s) 120 may be, or otherwise include, models trained to analyze the first set of textual content provided by the user. For example, the machine-learned model 120 may be trained to process the first set of textual content to generate a second set of textual content that responds to the request from the user. For another example, the machine-learned model 120 may be trained to process the request data (e.g., a user can request a summary, an explanation, or submit a query) to generate an appropriate second set of textual data responsive to the request. The machine-learned model can also receive image data as context for the request.

Additionally, or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 130 as a portion of a web service (e.g., a service providing responses to user requests). Thus, one or more machine-learned models 120 can be stored and implemented at the user computing device 102 and/or one or more machine-learned models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the machine-learned models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be one or more of: textual content extracted from an image, a specific request from a user, image data, or other data provided by the user and used as context for the request. As an example, the machine-learned model(s) can receive input data that includes a first set of textual content that was extracted from an image and a summarization request. The machine-learned model(s) can process the input data and output, in response to the summarization request, a summary of the first set of textual content. The summary can be a second set of textual content. The second set of textual content can have less textual content than the first set of textual content.

In another example, the machine-learned model(s) can receive input data that includes a first set of textual content that was extracted from an image and an explanation request (which is a request to explain the textual content included in an image.) In some examples, the input data can be included in a prompt to the machine-learned model. The machine-learned model(s) can process the input data and output, in response to the explanation request, an explanation of the first set of textual content. The explanation can be a second set of textual content. The second set of textual content can have more textual content than the first set of textual content. In some examples, additional context information, like the age of the user submitting the request can be used to generate an age-appropriate explanation for a particular first set of textual content. In some examples, the output can also include other mediums as part of the explanation. For example, the output of the machine-learned model can include textual content, images, animations, videos, audio content, and so on.

In some examples, the machine-learned model(s) can receive input data that includes a first set of textual content that was extracted from an image, image data from the image, and a query received from a user. The query can be the input to the machine-learned model(s) as text or natural language data. For example, the user can select a query entry field included in the interface element (e.g., a button in the interface that initiates a query input interface) and then enter (or speak using an audio-based interface) a question into the interface. The machine-learned model(s) can process the text or natural language data of the query, the first set of textual content, and any image data provided as context to generate an output. The machine-learned model(s) can process the input data and output, in response to the query request, a query response.

The query response can be a second set of textual content. In some examples, the query response can include images, animations, videos, audio content, and so on. The query response can have more textual content than the first set of textual content. In some examples, additional context information, like the age of the user submitting the request or their location (if the user chooses to supply this information) can be used to generate an appropriate response for the model input.

FIG. 1 illustrates one example computing system that can be used to implement the present disclosure. Other computing systems can be used as well. For example, in some implementations, the machine-learned models 120 can be both trained and used locally at the user computing device 102.

Figure 2A:
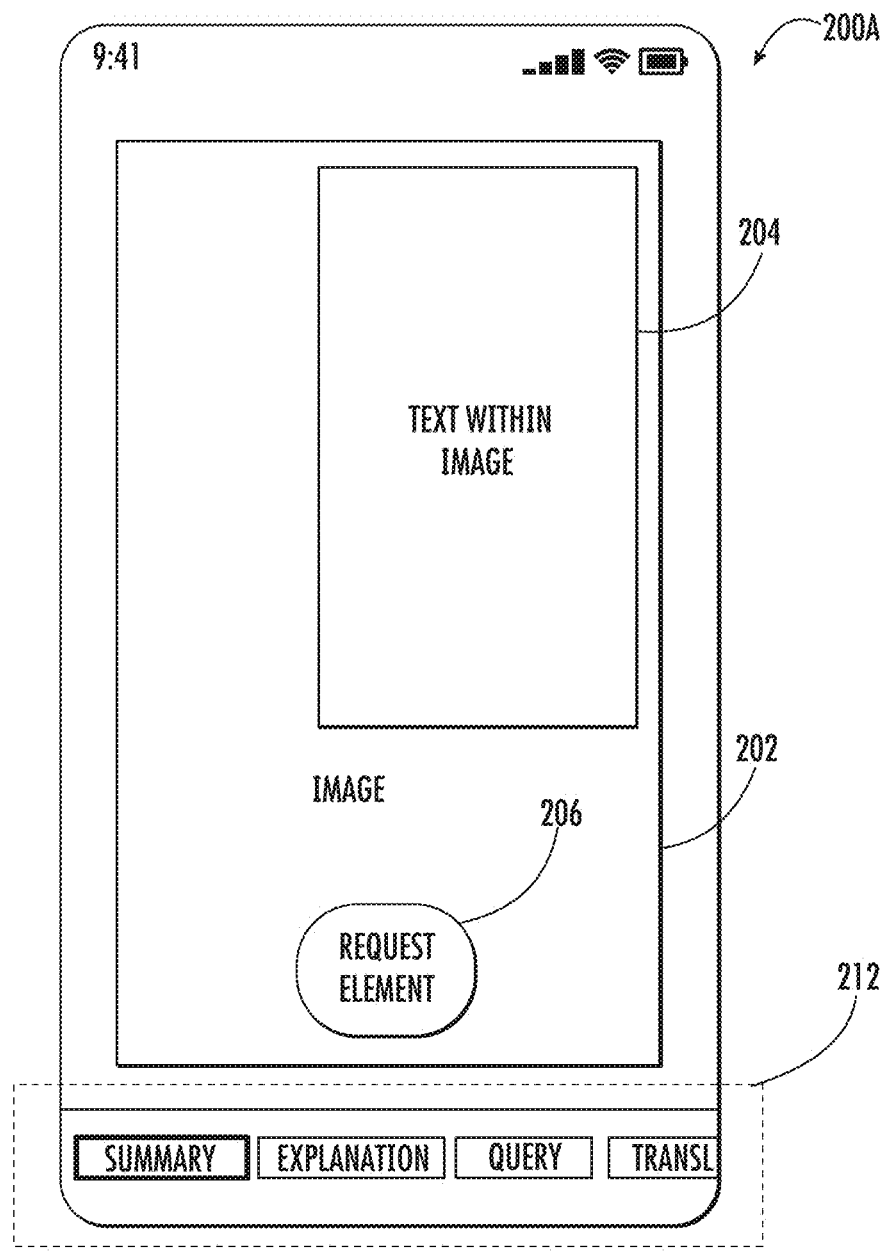
FIG. 2A illustrates an example interface for an application (e.g., an image recognition and analysis application) with an interface element indicative of a visual search feature of the application according to some embodiments of the present disclosure.

FIG. 2A illustrates an example user interface 200A for an application (e.g., an image recognition and analysis application) with an interface element indicative of a visual search feature of the application according to some embodiments of the present disclosure. Specifically, the user interface 200A depicts an interface for an application that displays images and enables users to make requests based on those images. As depicted, the user interface 200A includes a number of various interface elements with which the user can interact. For example, the user interface includes a toolbar 212 (e.g., a bar that links to various features of the user interface 200A), an image display region 202, and one or more interface elements (e.g., query element 206).

In some examples, the toolbar 212 can allow the user to select one or more different request type modes (e.g., summarization, explanation, search queries, and so on). Thus, if the user wishes to make a specific request, the user can select the associated label or icon within the toolbar 212. In some examples, the interface of the application can be updated based on the specific icon or label selected by the user in the toolbar. For example, if the user selects the translate label, the user interface may include elements that allows the user to select the target language of any translation. Similarly, if the user selects "search" or "query" specific, the user interface can include a query input element.

In some implementations, the user interface can include an image display region 202 for displaying images. Displayed images can include at least a portion that includes textual content 204. The textual content 204 can be analyzed to extract a first set of textual content. The user can select a user interface element 206. For example, if the user has selected the summary label, the displayed user interface element 206 can be a "Summary" button.

If the user selects the Summary button, the user computing device can generate an input (e.g., a prompt) to a machine-learned model. The machine-learned model can generate an output in response. The output can be a second set of textual content.

Figure 2B:
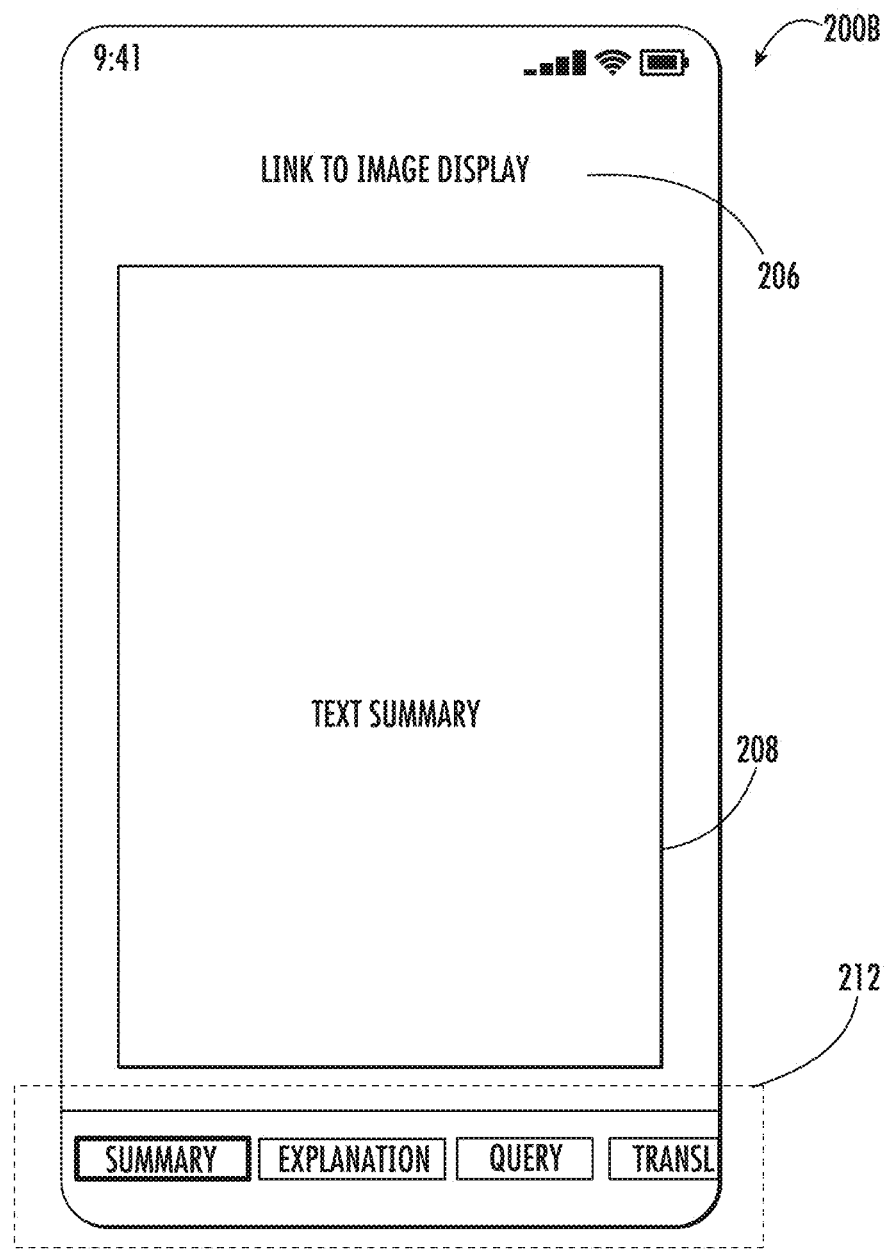
FIG. 2B illustrates an example interface for an application (e.g., a virtual assistant application) with a user interface for displaying a summarization of the textual content according to the embodiments of the present disclosure.

FIG. 2B illustrates an example user interface 200B for an application (e.g., a virtual assistant application) with a user interface for displaying a summarization of the textual content according to the embodiments of the present disclosure. This user interface 200B can be displayed when a user has requested a summarization of text included in an image. Specifically, the user interface 200B includes a text summary interface element 210. The text summary interface element 210 can include the output of a machine-learned model. The output of the machine-learned model can be a summarization of text extracted from the image displayed in FIG. 2A. In general, the text summary will have less textual content than the extracted text from the image.

In some examples, the user interface can also include an interface element that is a link 208 to the image display. For example, if the user requests a summary of text in an image, the user interface can update from the user interface 200A in which the image is displayed, and the user interface 200B in which the text summary interface element 210 is displayed. In order to easily allow the user to switch back to the user interface 200A in which the image is displayed, a link 208 to the image display within the user interface in which the text summary interface element 210 is displayed.

Figure 3A:
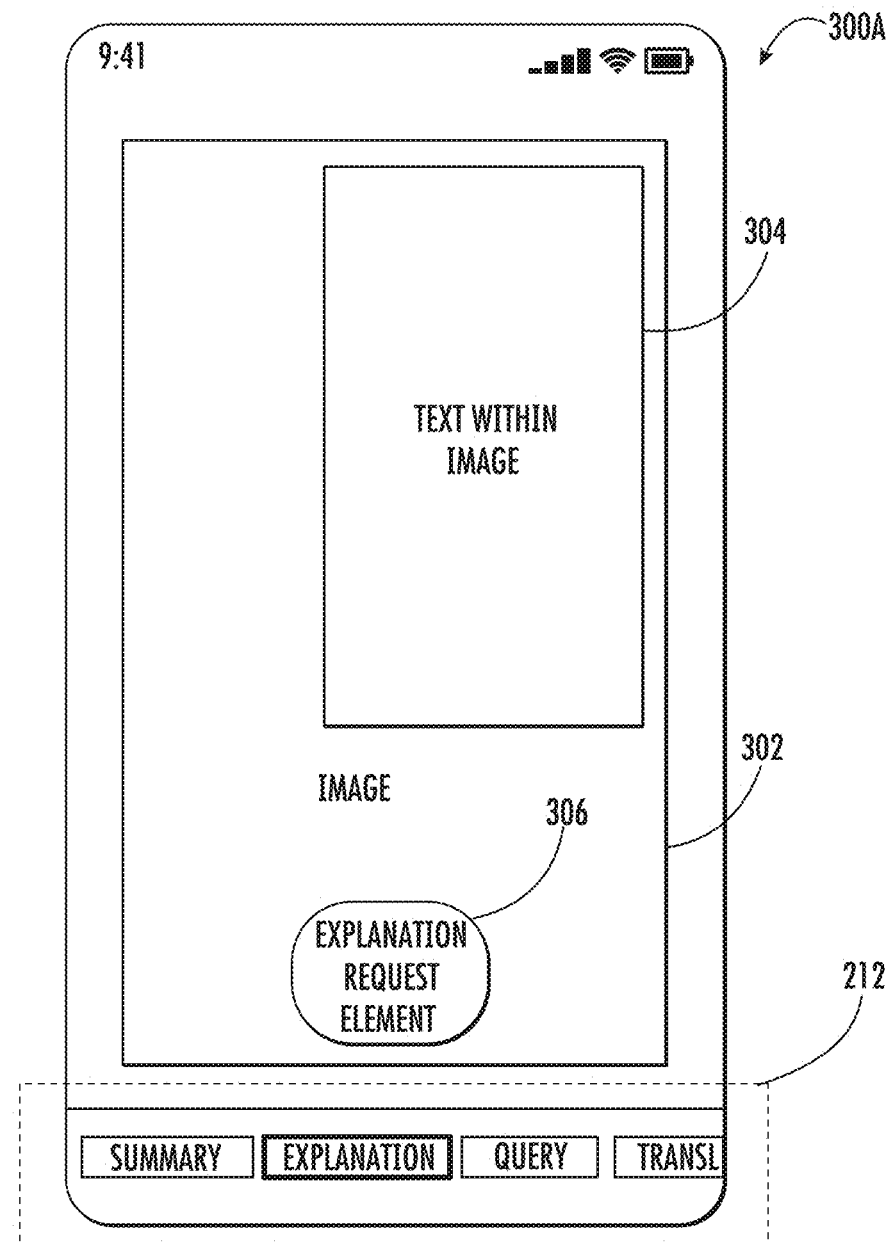
FIG. 3A depicts an example user interface with example embodiments of the present disclosure.

FIG. 3A depicts an example user interface 300A with example embodiments of the present disclosure. Specifically, the user interface 300A depicts an interface for an application that displays images and enables users to make requests based on those images. As depicted, the user interface 300A includes a number of various interface elements with which the user can interact. For example, the user interface includes a toolbar 212 (e.g., a bar that links to various features of the user interface 300A), an image display region 302, and one or more interface elements (e.g., explanation request element 306).

In some examples, the toolbar 212 can allow the user to select one or more different request types (e.g., summarization, explanation, search queries, and so on). Thus, if the user wishes to make a specific type of request, the user can select the associated label or icon within the toolbar 212. In some examples, the interface of the application can be updated based on the specific icon or label selected by the user in the toolbar. In this example, the user has selected "explanation" and the explanation label is bolded. If the user were to select a different label, that label would be bolded, and the interface may be updated to reflect the selected label.

In some implementations, the user interface can include an image display region for displaying images. Displayed images can include at least a portion that includes text within the image 304. The text within the image 304 can be analyzed to extract a first set of textual content. The user can select the explanation request element 306. As noted above, this specific user interface element (the explanation request element 306) may only be displayed when the "explanation" label is highlighted.

If the user selects the explanation request element 306, the user computing device can generate an input to a machine-learned model. The machine-learned model can generate an output in response. The output can be a second set of textual content and can contain an explanation associated with the image, the text within the image, or both.

Figure 3B:
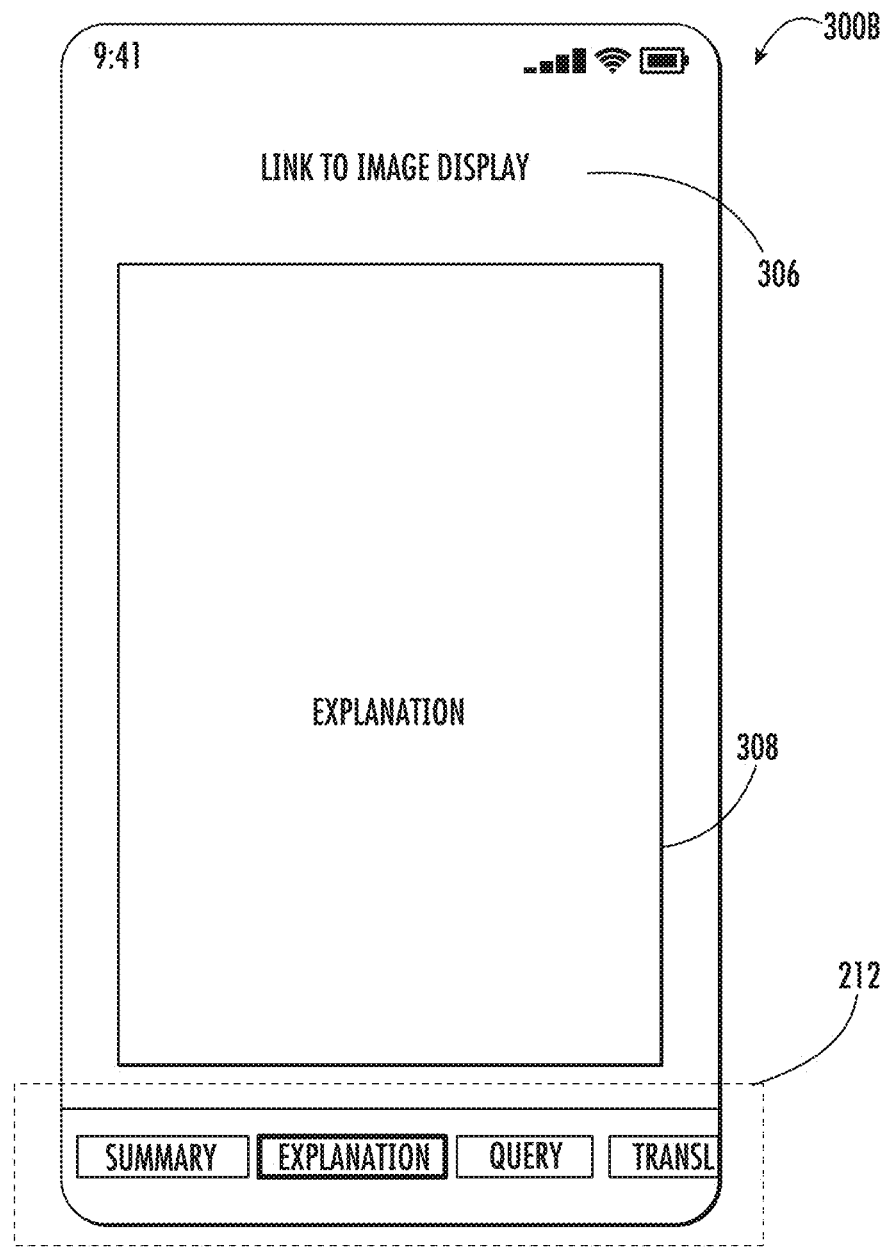
FIG. 3B illustrates an example interface for an application (e.g., a virtual assistant application) with a user interface for displaying an explanation of the textual content according to the embodiments of the present disclosure.

FIG. 3B illustrates an example user interface 300B for an application (e.g., a virtual assistant application) with a user interface for displaying an explanation of the textual content according to the embodiments of the present disclosure. This user interface 300B can be displayed when a user has requested an explanation of text included in an image. Specifically, the user interface 300B includes an explanation element 308. The explanation element 308 can include the output of a machine-learned model. The output of the machine-learned model can be an explanation of one or more concepts described by text in the image displayed in FIG. 3A. This text can be extracted from the image and included in a prompt which is input into the machine-learned model. The explanation (e.g., the output of the machine-learned model) can include, in addition to textual content, images, audio content, animations, video content, interactive content, and so on.

In some examples, the user interface 300B can also include an interface element that is a link 310 to the image display. For example, if the user requests a summary of text in an image, the user interface can update from the user interface 300A in which the image is displayed, and the user interface 300B in which the explanation 308 is displayed. In order to easily allow the user to switch back to the page of the user interface 300A in which the image is displayed, a link 310 to the image display within the user interface in which the explanation 308 is displayed.

Figure 4A:
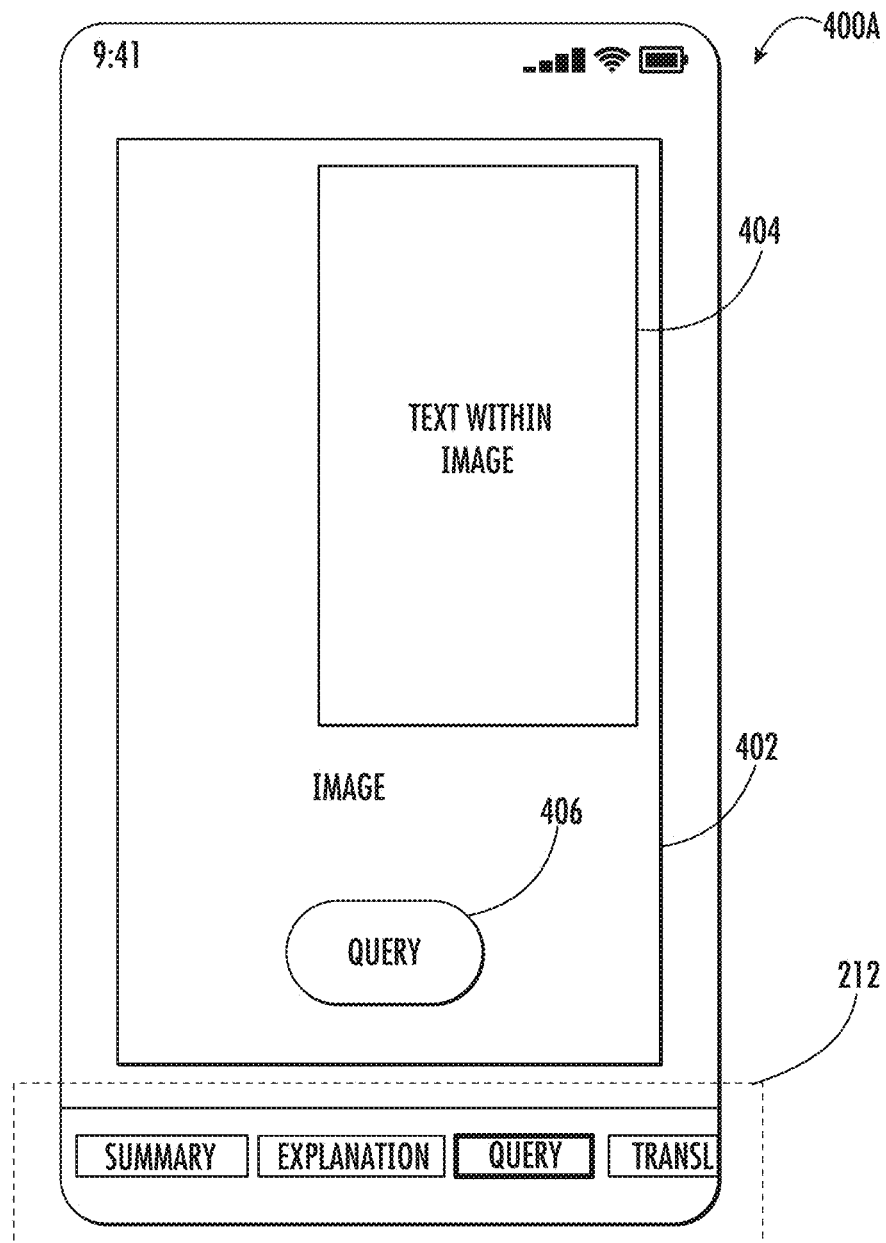
FIG. 4A depicts an example user interface with example embodiments of the present disclosure.

FIG. 4A depicts an example user interface 400A with example embodiments of the present disclosure. Specifically, the user interface 400A depicts an interface for an application that displays images and enables users to make requests associated with those images. As depicted, the user interface 400A includes a number of various interface elements with which the user can interact. For example, the user interface includes a toolbar 212 (e.g., a bar that links to various features of the user interface 400A), an image display region 402, and one or more interface elements (e.g., a query request element 406).

In some examples, the toolbar 212 can allow the user to select one or more different request types (e.g., summarization, explanation, search queries, and so on). Thus, if the user wishes to make a specific type of request, the user can select the associated label or icon within the toolbar 212. In some examples, the interface of the application can be updated based on the specific icon or label selected by the user in the toolbar. In this example, the user has selected "query" and the query label is bolded. If the user were to select a different label, that label would be bolded, and the interface may be updated to reflect the selected label.

In some implementations, the user interface 400A can include an image display region for displaying images. Displayed images can include at least a portion that includes textual content 404. The textual content 404 can be analyzed to extract a first set of textual content. The user can select the query request element 406. As noted above, this specific user interface element may only be displayed when the "explanation" label is highlighted.

If the user selects the query request element 406, the user computing device can generate an input to a machine-learned model. The machine-learned model can generate an output in response. The output can be a second set of textual content.

Figure 4B:
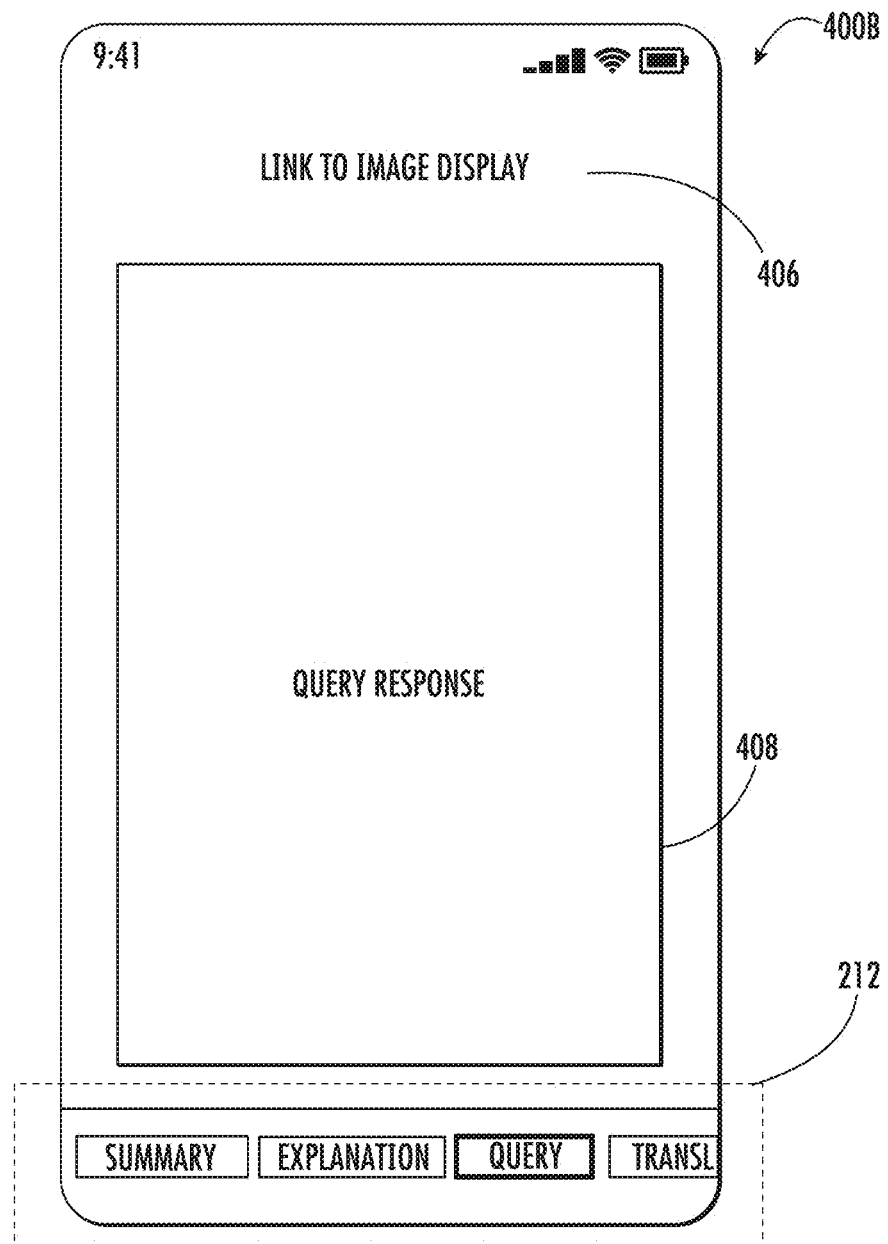
FIG. 4B illustrates an example interface for an application (e.g., a virtual assistant application) with a user interface for displaying an explanation of the textual content according to the embodiments of the present disclosure.

FIG. 4B illustrates an example user interface 400B for an application (e.g., a virtual assistant application) with a user interface for displaying an explanation of the textual content according to the embodiments of the present disclosure. This user interface 400B can be displayed when a user wishes to submit a query associated with the image and the text included in an image. Specifically, the user interface 400B includes a query response element 408. The query response element 408 can include the output of a machine-learned model. The output of the machine-learned model can be responsive to the query submitted by a user using the image displayed in FIG. 4A as background when input into the machine-learned model. The response can include, in addition to textual content, images, audio content, animations, video content, interactive content, web search content, and so on.

In some examples, the user interface 400B can also include an interface element that is a link 410 to the image display. For example, if the user requests a summary of text in an image, the user interface can update from the user interface 400A in which the image is displayed, and the user interface 400B in which the query response 408 is displayed.

In order to easily allow the user to switch back to the user interface 400A in which the image is displayed, a link 410 to the image display within the user interface in which the query response element 408 is displayed.

Figure 5:
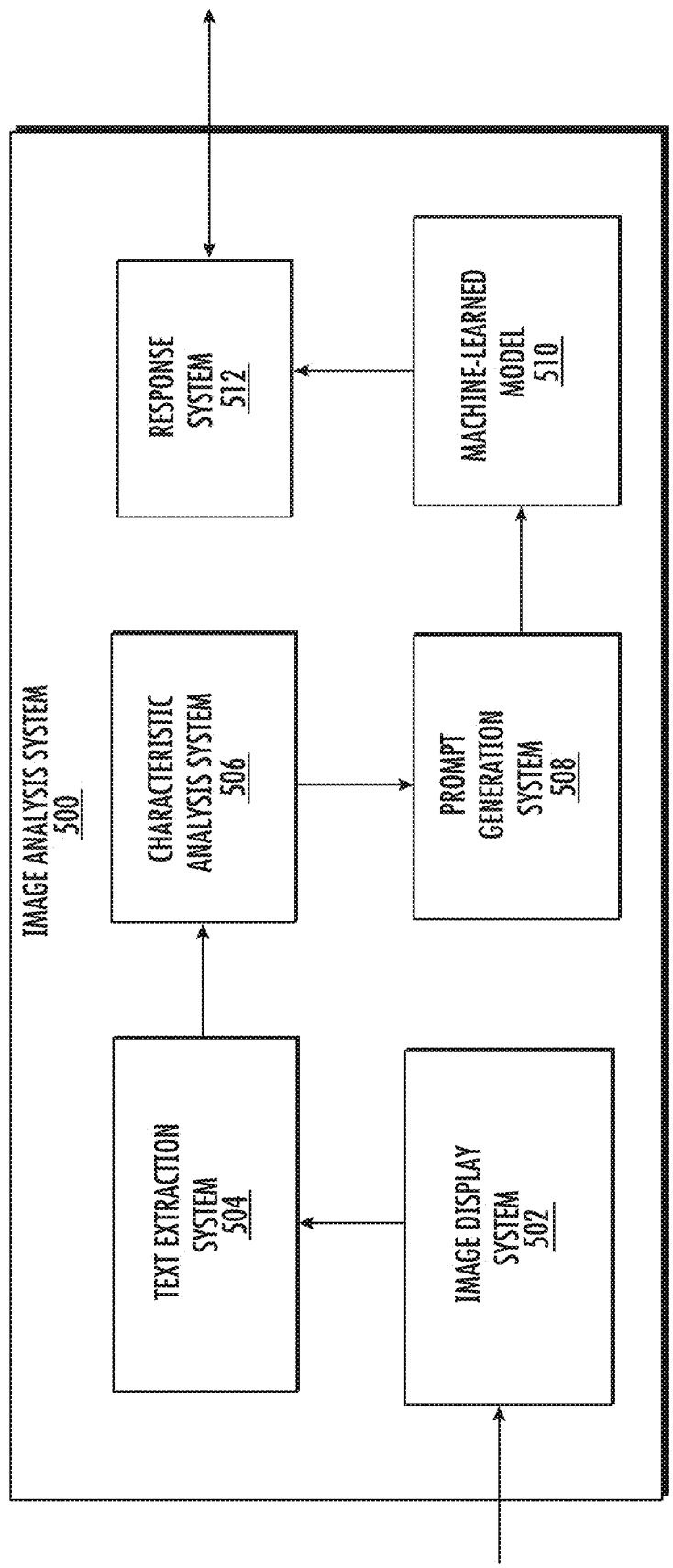
FIG. 5 is an example image analysis system according to example embodiments of the present disclosure.

FIG. 5 is an example image analysis system according to example embodiments of the present disclosure. The image analysis system 500 can include image display system 502, a text extraction system 504, a characteristic analysis system 506, a prompt generation system 508, a machine-learned model 510, and a response system 512.

An image display system 502 can display an image (or video composed of multiple images) in the interface of a user computing device. In some examples, the displayed image is an image previously captured by the camera associated with the user computing device. In some examples, the images are part of a live video being currently captured by the user computing device. In some examples, the image is captured previously or by another user computing device and was obtained by the current user community device via the computer network. In some examples, the image displayed can include textual content. The image display system 502 can include an application for capturing, displaying, and analyzing images.

Once the image display system 302 has displayed an image that includes text, the text extraction system 504 can extract the text from the image. In some examples, the text in the image is automatically extracted using an OCR process. In other examples, the text is only extracted when a request from the user requires the text to be extracted. The extracted text can be referred to as a first set of textual content.

In some examples, once the text has been extracted, a characteristic analysis system 506 can analyze the first set of textual content, the image, and any input provided by the user to determine one or more characteristics associated with the text/image. Characteristics can include the language of the text, the density of the text, the context of the image/video (e.g., is the image of learning materials), any queries submitted by the user while the text/image is displayed, and so on. For a specific example, the characteristic analysis system 506 can determine the density associated with the text in the displayed image (e.g., words per pixel or another measure).

The characteristic analysis system 506 can determine an appropriate response type based on the one or more characteristics. For example, if the density of text exceeds a threshold, the characteristic analysis system 506 can determine that the appropriate response type is the summary response type. Once the characteristic analysis system 506 has determined the suitable or appropriate response type, the image display system 502 can update the user interface to include an element in the interface associated with the response type. For example, if the response type is the summary response type, the image display system 502 can update the user interface to include a "summarize" button.

The user can input a request via the user interface. In some examples, the user interface includes a user interface element associated with one or more response types. Each user interface element can allow the user to request a particular type of response. In some examples, the user can select the type of service to be requested by selecting one-on-one labels displayed below the image. If the user has selected a particular label, the user interface may be updated to include user selectable user interface elements associated with a particular type of request that the label is associated with.

For example, if the user has selected a summarize label, the user interface element may be a button that reads "summarize this" displayed near or over the text in the image. The user can select that button to request that the system summarize the text. In other examples, the user interface element is a generic request element, and the user can type into a prompt the specific request being requested. For example, a user may ask the system for an explanation of difficult text by opening a query entry field and using natural language to request that the system explain the text. In another example, when viewing difficult text in an image a user can select a search icon that opens up something in which they can type a request for an explanation (or other response). The user computing device can use natural language processing techniques to understand the request and generate an appropriate response to the request.

Once a request has been received, the prompt generation system 508 can generate a prompt for use as input to a machine-learned model based on the request. For example, the prompt can include the first set of textual content, the determined response type, information about the image from which the text was extracted as background, and any additional prompts received from the user with respect to the request.

The prompt can be used as input to a machine-learned model 510. For example, the machine-learned model can be a large language model that takes prompts as input and output responses based on the data included in the prompt. In some examples, the machine-learned model can be hosted in a remote computing system and inputting the data can involve transmitting the prompt to the remote computing system using one or more communication networks.

In some examples, the machine-learned model can process the prompt and output a response. In some examples, the response includes a second set of textual content. For example, if the request is to summarize the text, the output can be a summary of the text. If the request is a request that the first set of textual content be explained, the output can be an explanation of the first set of textual content. In some examples, the request is a query type in which the user asks a question about the text and/or the image. In this example, the output can be a response to the query.

The response system 512 can receive the output of the machine-learned model 510. The output can then be displayed to the user in the user interface of the user computing device. In some examples, the user computing device can display the output on a separate page of the interface than the original image. In some examples, the output of the model can be displayed in the same user interface as the image.

Figure 6:
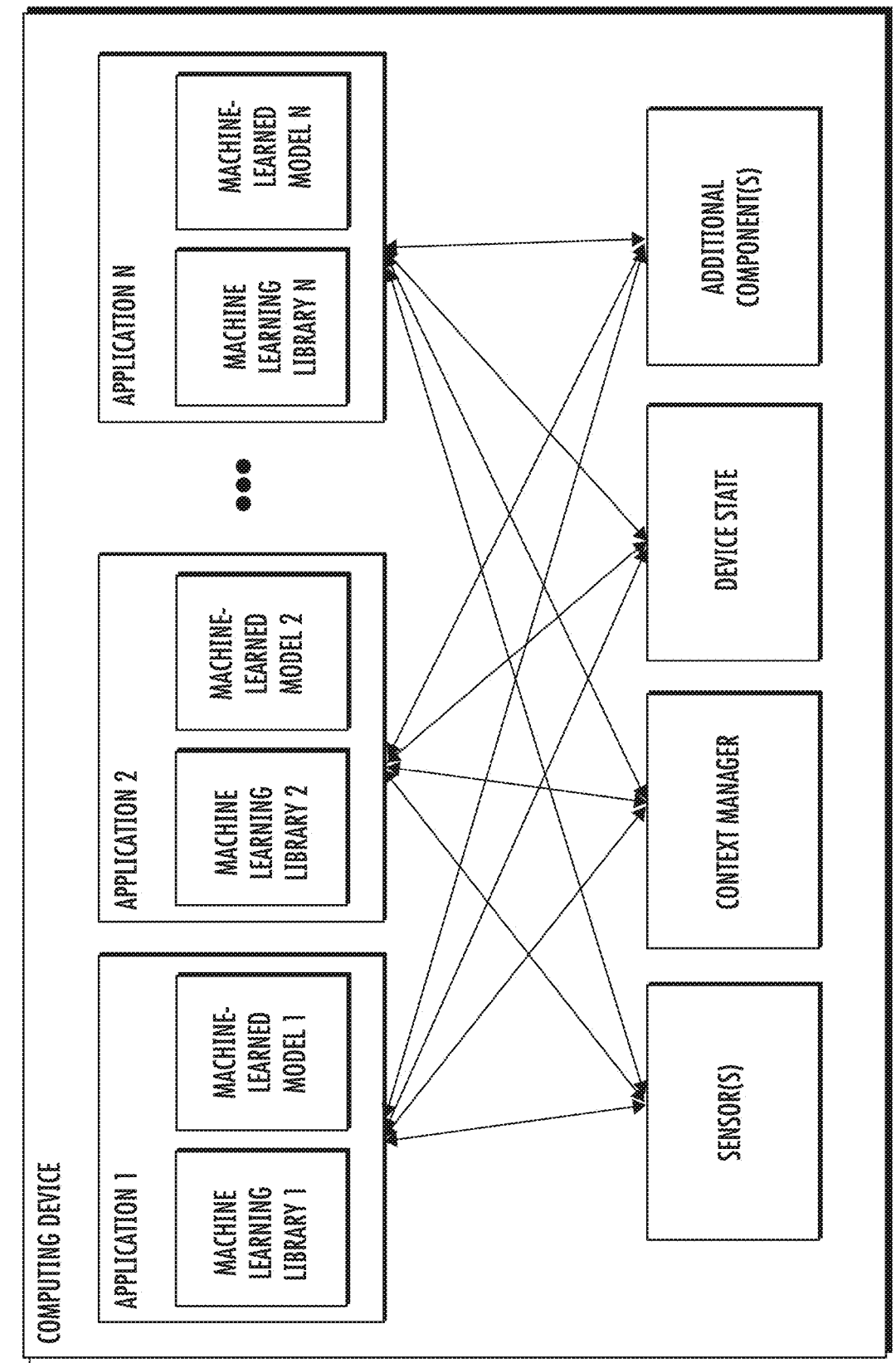
FIG. 6 depicts a block diagram of an example computing device that performs according to example embodiments of the present disclosure.

FIG. 6 depicts a block diagram of an example computing device 600 that performs according to example embodiments of the present disclosure. The computing device 600 can be a user computing device or a server computing device.

The computing device 600 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, search application, a query response application, an image display application, etc.

As illustrated in FIG. 6, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 7:
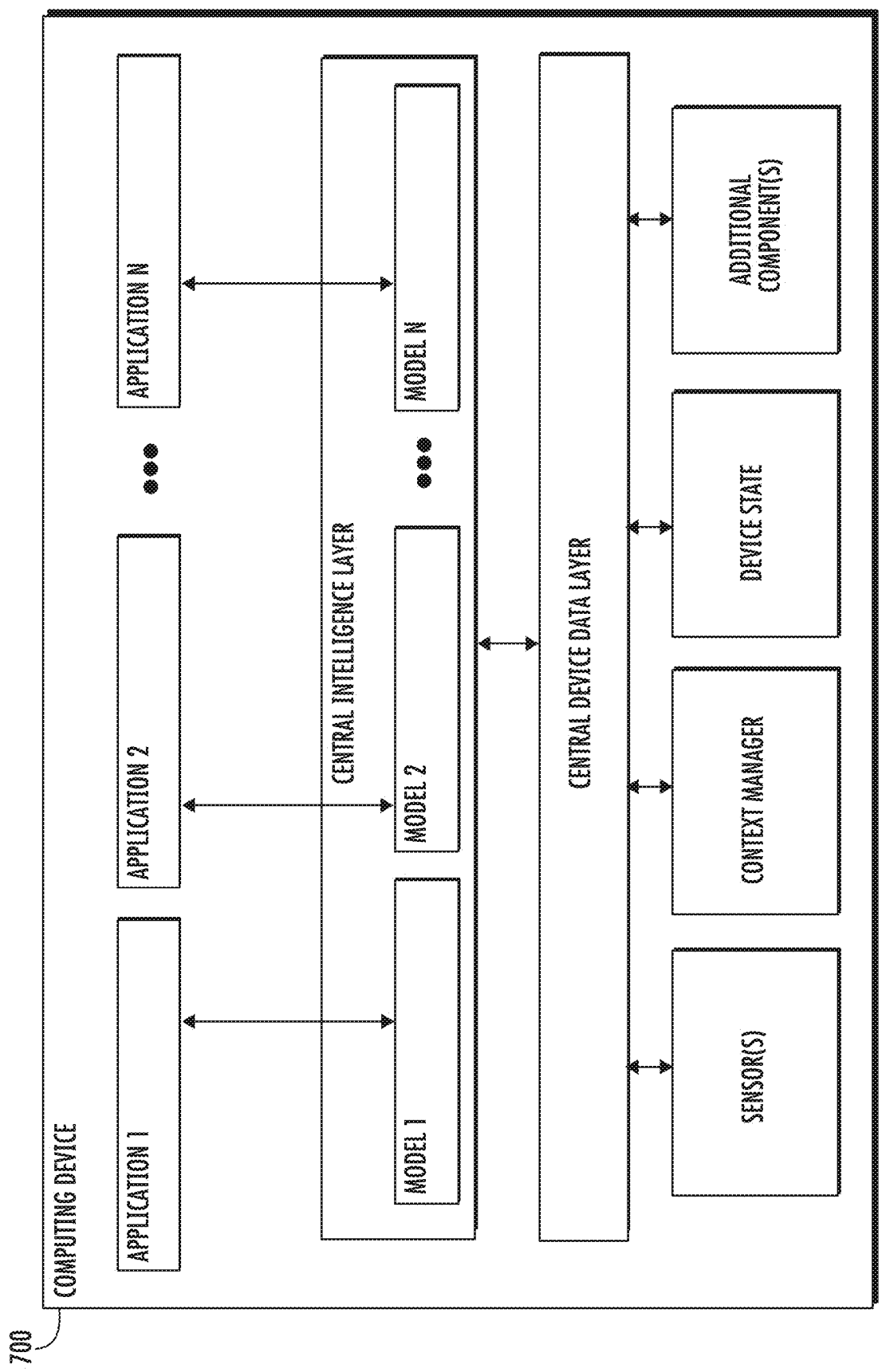
FIG. 7 depicts a block diagram of an example computing device 700 that performs according to example embodiments of the present disclosure.

FIG. 7 depicts a block diagram of an example computing device 700 that performs according to example embodiments of the present disclosure. The computing device 700 can be a user computing device or a server computing device.

The computing device 700 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device.

The central intelligence layer can communicate with a central device data layer. The central device data layer can be a centralized repository of data for the computing device 700. As illustrated in FIG. 7, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 8:
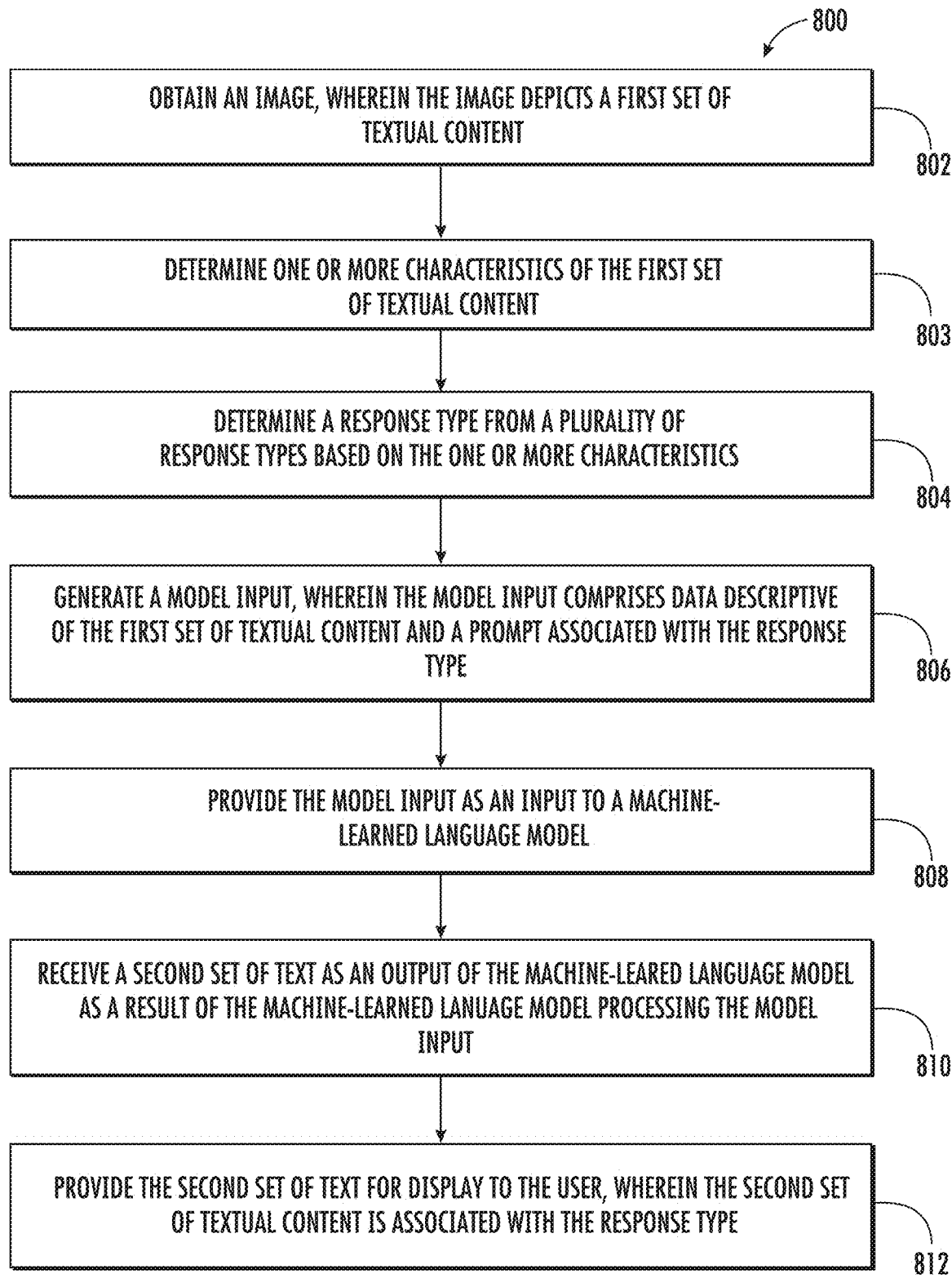
FIG. 8 depicts an example flow diagram for a method of providing appropriate responses based on the characteristics of an image and the text contained therein according to example embodiments of the present disclosure.

FIG. 8 depicts an example flow diagram for a method of providing appropriate responses based on the characteristics of an image and the text contained therein according to example embodiments of the present disclosure. One or more portion(s) of the method can be implemented by one or more computing devices such as, for example, the computing devices described herein. Moreover, one or more portion(s) of the method can be implemented as an algorithm on the hardware components of the device(s) described herein. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. The method can be implemented by one or more computing devices, such as one or more of the computing devices depicted in FIGS. 1 and 5.

A user computing device (e.g., user computing device 102 in FIG. 1) can include one or more processors, memory, and one or more sensors. The user computing device 102 (e.g., user computing device 102 in FIG. 1) can include other components that, together, enable the user computing device 102 (e.g., user computing device 102 in FIG. 1) to analyze images, determine one or more response types, and respond to user requests based on the image, the determined response type, and input from the user.

In some examples, the user computing device can obtain, at 802, an image, wherein the image depicts a first set of textual content. In some examples, an optical character recognition process is used to generate text data representing the content of the first set of textual content from the image.

In some examples, the user computing device (e.g., user computing device 102 in FIG. 1) can determine, at 803, one or more characteristics of the first set of textual content. Characteristics can include the density of the text, the content in the image, the input from the user, and so on.

In some examples, the user computing device (e.g., user computing device 102 in FIG. 1) can, at 804, determine a response type from a plurality of response types based on the one or more characteristics. In some examples, the plurality of response types includes a summarization response, an explanation response, and a query response. In some examples, the user computing device can determine a density for the first set of textual content within the image. Responsive to a determination that the density for the first set of textual content within the image satisfies a threshold, the user computing device can update the user interface to include a summary user interface element. In some examples, the user request is input by a user selecting the "summarize" user interface element displayed proximate to the image in the user interface of a user computing device.

In some examples, the User computing device (e.g., user computing device 102 in FIG. 1) can, in response to user input associated with an element of the user interface, generate model input for a machine-learned model. In some examples, the user request is input by a user selecting the "summarize" user interface element displayed proximate to the image in the user interface of a user computing device. In some examples, the second set of textual content has less textual content than the first set of textual content.

In some examples, the user computing device (e.g., user computing device 102 in FIG. 1) can, at 806, generate a model input, wherein the model input comprises data descriptive of the first set of textual content and a prompt associated with the response type.

In some examples, the user computing device can, at 808, provide the model input as an input to a machine-learned language model. In some examples, the machine-learned model is a large language model. The user computing system can generate the model input in response to a user request. In some examples, the model input to the machine-learned model is multimodal. In some examples, the machine-learned language model is operated at a remote server system and the model input is transmitted to the remote server system and the second set of textual content is received from the remote server system.

The user computing device can, at 810, receive a second set of text as an output of the machine-learned language model as a result of the machine-learned language model processing the model input. The user computing device can, at 812, provide the second set of text for display to the user, wherein the second set of textual content comprises a summarization of the first set of textual content.

In some examples, the user computing device updates the user interface to display the second set of textual content. The second set of textual content can have less textual content than the first set of textual content.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, the system comprising:
   one or more processors; and
   one or more non-transitory computer-readable media that collectively store instructions that, when executed by the one or more processors, cause the computing system to perform operations, the operations comprising:
   accessing an image displayed by the computing system, wherein the image depicts a first set of displayed textual content;
   determining one or more characteristics of the first set of displayed textual content, wherein the one or more characteristics of the first set of displayed textual content includes a density of the first set of displayed textual content;
   responsive to a determination that the density for the first set of displayed textual content within the image satisfies a threshold, updating a user interface to include a summarize user interface element;
   generating a model input, wherein the model input comprises data descriptive of the first set of displayed textual content and a prompt including instructions to create a summary of the first set of displayed textual content;
   providing the model input as an input to a machine-learned language model;
   receiving a second set of text as an output of the machine-learned language model as a result of the machine-learned language model processing the model input; and
   providing the second set of text for display to a user, wherein the second set of textual content is a summary of the first set of displayed textual content.

2. The computing system of claim 1, wherein determining the density of the first set of displayed textual content within the image further comprises:
   determining an area of the image that includes the first set of displayed textual content;
   determining a total area of the image; and
   determining a percentage of the image that includes the first set of displayed textual content.

3. The computing system of claim 2, wherein determining the density of the first set of displayed textual content within the image further comprises:
   determining a total number of words visible in the image.

4. The computing system of claim 3, wherein determining the density of the first set of displayed textual content within the image further comprises:
   determining a number of words per pixel in the image.

5. The computing system of claim 4, wherein the computing system generates the model input in response to a user request.

6. The computing system of claim 5, wherein the user request is input by a user selecting the summarize user interface element displayed proximate to the image in the user interface of a user computing device.

7. The computing system of claim 1, wherein the second set of textual content has less textual content than the first set of displayed textual content.

8. The computing system of claim 1, wherein an optical character recognition process is used to generate text data representing the content of the first set of displayed textual content from the image.

9. The computing system of claim 1, wherein the machine-learned language model is a large language model.

10. The computing system of claim 1, the operations further comprising:
    updating the user interface to display the second set of textual content.

11. The computing system of claim 1, wherein the input to the machine-learned model is multimodal.

12. The computing system of claim 1, wherein the machine-learned language model is operated at a remote server system and the model input is transmitted to the remote server system and the second set of textual content is received from the remote server system.

13. A computer-implemented method for summarizing text in an image, the method comprising:
    accessing, by a computing system with one or more processors, an image displayed by the computing system, wherein the image depicts a first set of textual content;
    determining, by the computing system, one or more characteristics of the first set of displayed textual content, wherein the one or more characteristics of the first set of displayed textual content includes a density of the first set of displayed textual content;
    responsive to a determination that the density for the first set of displayed textual content within the image satisfies a threshold, updating, by the computing system, a user interface to include a summarize user interface element;
    generating, by the computing system, a model input, wherein the model input comprises data descriptive of the first set of displayed textual content and a prompt including instructions to create a summary of the first set of displayed textual content;
    providing, by the computing system, the model input as an input to a machine-learned language model;
    receiving, by the computing system, a second set of textual content as an output of the machine-learned language model as a result of the machine-learned language model processing the model input; and
    providing, by the computing system, the second set of text for display to a user, wherein the second set of textual content is a summary of the first set of displayed textual content.

14. The computer-implemented method of claim 13, wherein determining the density of the first set of displayed textual content within the image further comprises:

determining, by the computing system, an area of the image that includes the first set of displayed textual content;

determining, by the computing system, a total area of the image; and determining, by the computing system, a percentage of the image that includes the first set of displayed textual content.

15. The computer-implemented method of claim 14, wherein determining the density of the first set of displayed textual content within the image further comprises:

determining, by the computing system, a total number of words visible in the image.

16. The computer-implemented method of claim 15, wherein determining the density of the first set of displayed textual content within the image further comprises:

determining, by the computing system, a number of words per pixel in the image.

17. One or more non-transitory computer-readable media that collectively store instructions that, when executed by one or more computing devices, cause the one or more computing devices to perform operations, the operations comprising:

accessing an image displayed by a computing device in the one or more computing devices, wherein the image depicts a first set of displayed textual content;

determining one or more characteristics of the first set of displayed textual content, wherein the one or more characteristics of the first set of displayed textual content includes a density of the first set of displayed textual content;

responsive to a determination that the density for the first set of displayed textual content within the image satisfies a threshold, updating a user interface to include a summarize user interface element;

generating a model input, wherein the model input comprises data descriptive of the first set of displayed textual content and a prompt including instructions to create a summary of the first set of displayed textual content;

providing the model input as an input to a machine-learned language model;

receiving a second set of text as an output of the machine-learned language model as a result of the machine-learned language model processing the model input; and providing the second set of text for display to a user, wherein the second set of textual content is a summary of the first set of displayed textual content.

18. The one or more non-transitory computer-readable media of claim 17, wherein determining the density of the first set of displayed textual content within the image further comprises:

determining an area of the image that includes the first set of displayed textual content;

determining a total area of the image; and determining a percentage of the image that includes the first set of displayed textual content.

19. The one or more non-transitory computer-readable media of claim 18, wherein determining the density of the first set of displayed textual content within the image further comprises:

determining a total number of words visible in the image.

20. The one or more non-transitory computer-readable media of claim 19, wherein determining the density of the first set of displayed textual content within the image further comprises:

determining a number of words per pixel in the image.

\* \* \* \* \*